Jan. 5, 1965
E. T. OAKES ETAL
3,164,107
APPARATUS FOR MAKING DOUGH
Filed May 10, 1961
3 Sheets-Sheet 1
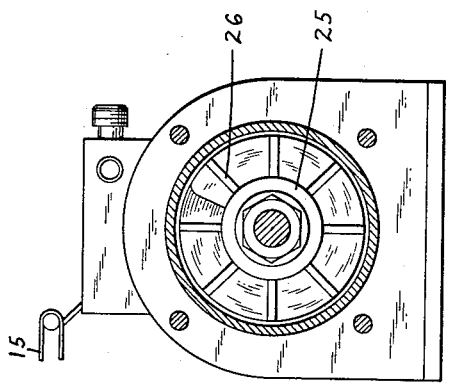
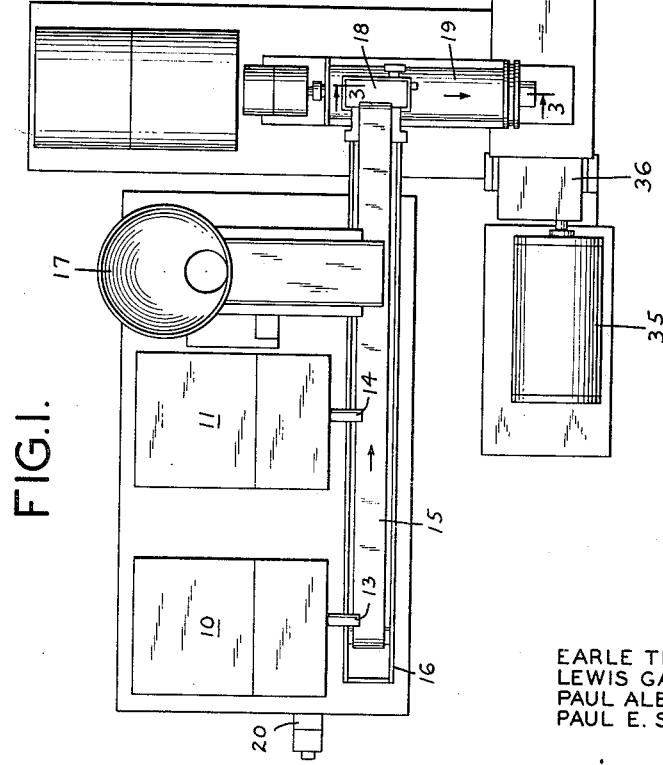
INVENTORS:
EARLE THOMAS OAKES
LEWIS GARTH DOOM
PAUL ALBERT McELLIGOTT
PAUL E. SUNDHEIM
BY
*Brumbaugh, Free, Graves & Donohue*
THEIR ATTORNEYS

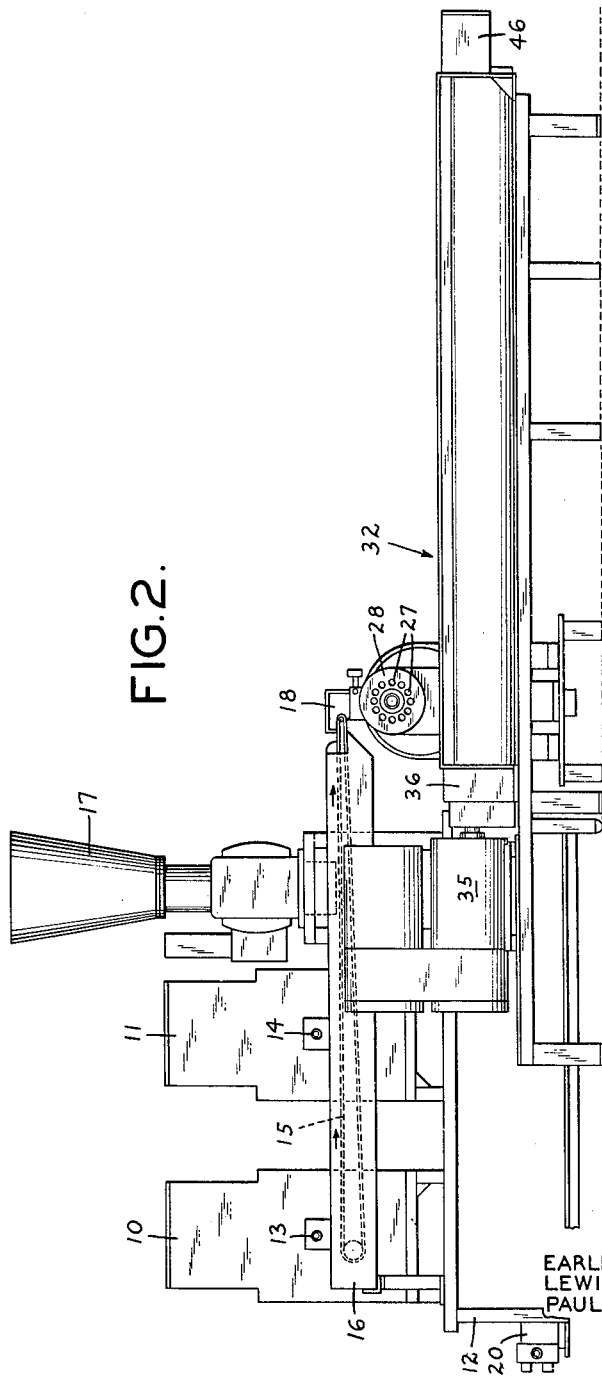

Jan. 5, 1965    E. T. OAKES ETAL    3,164,107
APPARATUS FOR MAKING DOUGH
Filed May 10, 1961    3 Sheets-Sheet 3
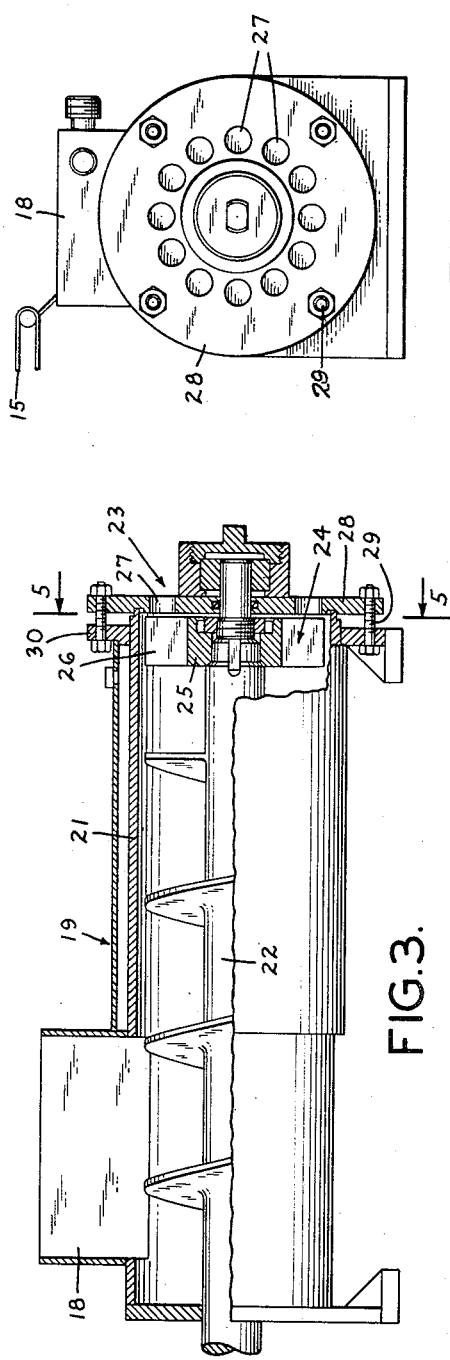
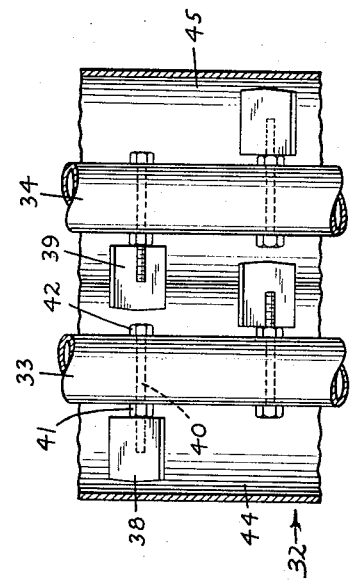
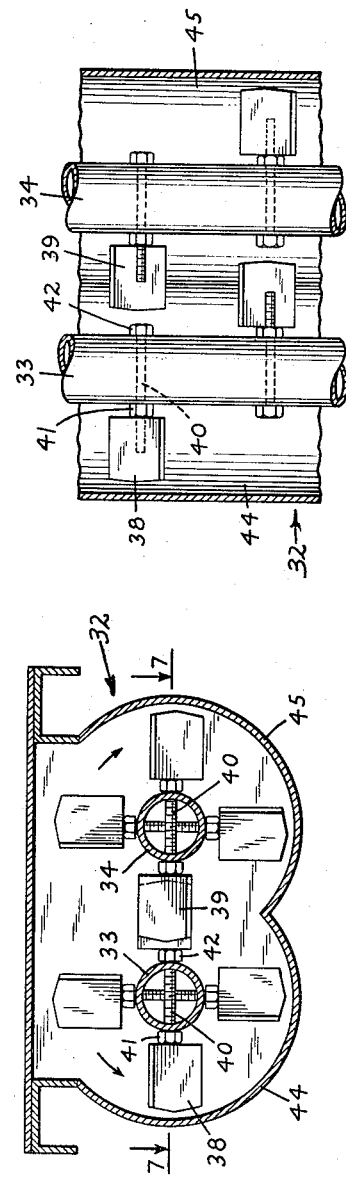
INVENTORS:
EARLE THOMAS OAKES
LEWIS GARTH DOOM
PAUL ALBERT McELLIGOTT
PAUL E. SUNDHEIM
BY
Brumbaugh, Free, Graves & Donohue
THEIR ATTORNEYS 3,164,107
APPARATUS FOR MAKING DOUGH
Earle Thomas Oakes, Islip, Lewis Garth Doom, East Islip, Paul Albert McElligott, Greenlawn, and Paul E. Sundheim, Bayport, N.Y., assignors to The E. T. Oakes Corporation, Islip, N.Y., a corporation of New York
Filed May 10, 1961, Ser. No. 109,177
7 Claims. (Cl. 107—30)

This invention relates to improvements in apparatus for making dough continuously and it relates particularly to mixing apparatus for mixing pastry, cracker, biscuit dough and other doughs which are of such texture or plasticity that they will not readily flow of their weight.

The above-mentioned types of dough are conventionally made in the baking industry by means of conventional horizontal or vertical batch mixers. In most batch mixing operations, the liquids, sugars, and fats are introduced first into the mixer where they are creamed. This operation requires about 3 to 5 minutes. The mixer is then stopped and the balance of the liquid and dry ingredients is then added and mixing is continued for an additional 12 to 15 minutes depending upon the requirements of the dough.

In batch mixing, it is almost impossible to control the uniformity of successive batches of dough. The ingredients for each batch must be weighed out separately and put into the mixer. Errors almost inevitably occur during the weighing operation. Moreover, the mixing elements of a batch mixer are in contact with a very low percentage of the material with which it is charged at any one time. As a consequence, the extent of mixing varies, the temperature induced by the mixing operation varies and the end result is a product which may vary substantially in its consistency and homogeneity. Following the mixing operation, the dough is emptied into a trough and is then moved to machinery where it is formed into sheets or units of proper size and shape for introduction into the baking oven. The dough is removed from the trough by shoveling it out or by raising the trough into such position that the attendant can transfer the dough with his hands rather than a shovel. A dough trough may contain as much as 500 pounds of dough and the time required to empty it may be as much as 20 minutes. This time is sufficient for the consistency of the dough to change in character. The variations in the resulting dough give the operators of the forming equipment and ovens the need to be constantly alert. Nevertheless, in spite of their attention, there is considerable variation in the physical properties of the finished product resulting in wasted goods both prior to and after baking.

In accordance with the present invention, a dough mixing machine is provided in which uniform conditions of treatment of the ingredients of the dough are assured thereby producing a uniform product at a high production rate.

More particularly, in accordance with the invention, the new machine includes mechanisms by means of which the wet and dry ingredients of dough are metered continuously and accurately into a mechanism where they are subjected to mixing, agitating, kneading and under uniform conditions and in such amounts that a uniform product is produced continuously. By mixing relatively small amounts continuously, the temperature and other conditions countered in the production of dough can be stabilized at the optimum level. In this way, the mixer eliminates the shortcomings of batch mixing and, in addition, enables a much more efficient production of the dough.

In one form of the invention, the wet and dry ingredients are measured by automatic weighing and metering devices into a conveyor of the screw type which supplies the ingredients to a mixing chamber including a rotor which thoroughly mixes the ingredients and forces them through an orifice plate in relatively small streams into a trough where the streams of dough are kneaded, advanced and are allowed to age over a closely regulated period of time so that the dough discharged therefrom is of uniform consistency. Mixing and subsequent kneading of the dough is of such nature as to render the dough tender and of such properties that crackers, for example, made from the dough are uniform in weight and strength thereby facilitating the packaging thereof.

For a better understanding of the present invention, reference may be had to the accompanying drawings in which:

FIG. 1 is a plan view of a typical continuous dough mixing machine of the type embodying the present invention;

FIG. 2 is a side-elevational view of the machine;

FIG. 3 is a view in section taken on line 3—3 of FIG. 1;

FIG. 4 is an end-elevational view of the mixing device disclosed in FIG. 3;

FIG. 5 is a view in section taken on line 5—5 of FIG. 3;

FIG. 6 is a view in section taken on line 6—6 of FIG. 1; and

FIG. 7 is a fragmentary top plan view of a portion of the apparatus disclosing details thereof.

The form of the machine chosen for purposes of illustration includes a plurality, in this case, two gravimetric feeders 10 and 11 mounted on a supporting frame 12 and having their discharge tubes 13 and 14 overlying an endless belt conveyor 15 mounted in a framework 16 at the top of the frame 12 and below the nozzles 13 and 14. The feeders 10 and 11 may be any well-known or commercially accepted, continuous accurate weighing machine and are used to supply flour and other dry ingredients in accurately measured amounts to the conveyor 15. Other feeders of a different type may also be included in the machine such as a hopper-type scale feeder 17.

The dry ingredients discharged onto the conveyor 15 are carried to and discharged in a continuous stream into the hopper 18 of a screw conveyer 19. Also, liquid ingredients may be supplied by means of a metering pump 20 (FIG. 2) carried by the frame 12 or by a plurality of such metering pumps to the hopper 18 of the screw conveyer 19. Some dry ingredients such as salt, sugar etc. can be dissolved in the liquid ingredients and supplied therewith by means of the metering pump 20.

On introduction of the ingredients into the hopper 18, they are advanced along the casing 21 (FIG. 3) of the screw conveyer by means of the constant pitch screw 22 therein. The screw conveyer 19 discharges ingredients into the mixer 23 which includes a rotor 24 having a hub 25 fixed to the right-hand end of the screw 22 and rotatable therewith. A series of flat radially extending blades 26 (FIGS. 3 and 5) of relatively short extent are fixed to the hub and as the screw rotates, the blades beat, knead and agitate the ingredients of the dough. With the aid of the pressure supplied by the screw 22 the resulting dough is forced through the orifices 27 in an orifice plate 28 (FIGS. 3 and 4) detachably secured to the end of the screw-conveyer casing by means of bolts 29 extending through a flange 30 at the end of the casing and through the rim of the orifice plate 28.

Inasmuch as a screw conveyer is not a positive feeding device, slippage can occur between the screw and the ingredients in response to back-pressure in the conveyer and mixer 23 so that the ingredients are supplied to the rotor and discharged through the orifices 27 under an essentially continuous pressure. The uniformity of pressure in the system and the uniform rate of feed of the material therefore assures a uniform mixing of the material and essentially uniform temperature conditions can be maintained in the mixer 23 by means of jacketing around the mixer (not shown).

In order to assure uniformity of mixing of the ingredients and control of pressure thereon, the orifices should be between about ⅞ of an inch and 1½ inches in diameter.

It will be understood that the feeders, metering pumps, mixer and screw conveyer are coordinated and correlated in their action, and that variable speed drives may be provided for each of these devices to enable them to be adjusted for various formulations and mixing conditions. However, when the mixing conditions for a particular formulation have been established by adjusting the various drives, no further changes are required to produce a uniform product continuously. If, for example, it is desired to make dough at a lower rate, the entire machine can be slowed down but nevertheless the proportions of the ingredients and the amount of mixing remain the same. The same is true if higher production rate is required since the residence time of the ingredients in the mixer will be reduced.

Some types of doughs can be taken directly from the orifices 27 and supplied to the forming or shaping machinery for formation into sheets, balls or the like to be supplied to the baking oven. However, in the case of doughs needing a lay time, the dough is discharged into a chamber in the form of an elongated trough 32 which is provided with a pair of counter-rotating shafts 33 and 34 (FIGS. 6 and 7) driven by means of a suitable motor 35 and reduction gear 36 as shown in FIG. 1. Shafts are provided with paddles 38, 39 and so forth which are arranged in spaced relation and angularly disposed around the shafts 33 and 34. As best shown in FIGS. 6 and 7, the paddles are so arranged that when the shafts are driven in counter-rotation as mentioned above, the orbits of the paddles overlap and thereby assure a constant and thorough mixing and kneading of the dough as it moves along the trough. The spacing between the shafts 33 and 34 is only slightly greater than the radial extent of the paddles 38 and 39 so that few dead spaces are left between them in which the dough is not subjected to kneading action. The angularity of the paddles can be changed as required by providing them with screw-threaded shafts 40 as shown in FIG. 6. Each shaft 40 extends through a shaft 33 or 34 and is locked in adjusted position by means of nuts 41 and 42 on opposite ends of the threaded shaft. In order also to further assure thorough mixing and movement of all of the dough along the trough, the bottom and sides 44 and 45 of the trough may be curved as intersecting surfaces of revolution of slightly greater radius than the radius of paddles.

The inclination of the paddles 38 and 39 is such that dough in the trough is lifted, kneaded, agitated and advanced slowly along the trough and retained therein for a predetermined length of time, for example, 2 to 12 minutes more or less as may be required. The dough is discharged continuously from the chute 46 at the right-hand end of the trough and may be supplied continuously to a dough sheeter or the like (not shown) which may suitably consist of a pair or plurality of pairs of sheeting rolls which gradually reduce the thickness of the dough to the desired value. In making the crackers, the dough is suitably pricked and scored and is fed into the baking oven.

The mixing apparatus described above has the advantage of producing a dough of uniform texture, moisture content, density and the like. Accordingly, when the dough is reduced to a sheet of uniform thickness, the sheet is of a uniform weight. The weight of the dough is important since the baked product likewise is of a uniform weight which thereby assures the production of packages of uniform weight. Moreover, the product is of a uniform brittleness which is also important from the standpoint of packaging inasmuch as a broken or so-called "crippled" cracker or cookie ties up the equipment or produces a finished package which must be rejected.

Of great importance also is that with the apparatus described above, dough of a lower moisture content can be produced at a more elevated temperature which imparts the necessary plasticity to the dough to enable it to be sheeted and otherwise handled. By decreasing the moisture content, the baking time may be reduced from between 6½ to 7 minutes to between 5 and 5½ minutes thereby increasing production as much as 15%. Moreover, the lower moisture content provides a denser dough which enables the reduction in the thickness of the sheet prior to entering the oven. The sheet thickness in many instances may be from 8 to 15% less than the other sheets and it is able to take the baking heat more readily without exceeding weight tolerances and without blistering. The fact that the dough issuing from the agitating device 32 has predetermined moisture content is further important for the reason that little time is permitted for the dough to dry out or the gluten development to change or temperature changes occur between the time the dough is made and it is discharged to the forming machines. There is no long period of standing or inactivity between the discharge of the dough from the kneading section and the time that it enters the rolling or forming apparatus.

The new machine also can make advantageous use of and can handle trim scrap from the sheet of dough without adversely affecting the properties of the finished dough so long as the trim scrap is fed at a uniform and predetermined rate into the mixer.

From the foregoing, it will be apparent that a more uniform type of dough can be made with the new machine in a continuous operation due to its ability to meter the ingredients in exact proportion, mix them thoroughly and agitate, knead and otherwise treat the materials in a uniform manner.

It will be understood that the mechanical drive elements and the metering or measuring devices may be modified in type and number and the apparatus can be operated at speeds commensurate with the type of dough being produced.

Accordingly, the form of the machine and its operation as described above should be considered as illustrative and the invention should be considered as limited only by the terms of the following claims.

We claim:

1. Apparatus for making cracker dough and the like comprising a plurality of proportional feeders for supplying dry and liquid ingredients of dough, screw conveying means for receiving said ingredients and advancing them, a mixer communicating with said conveying means for receiving said ingredients therefrom and mixing them to form dough, said mixer having a rotor with flat radial blades lying in radial planes extending axially of said rotor and a fixed orifice plate through which said dough is discharged in at least one stream, an elongated trough for receiving said dough stream from said mixer, at least one shaft extending lengthwise of and rotatable relative to said trough, a plurality of paddles on and inclined to the axis of said shaft for kneading said dough and advancing it lengthwise of and discharging it from the trough at a place remote from said mixer, and means for actuating said feeders, screw conveying means, mixer, and shaft.

2. The apparatus set forth in claim 1 in which said orifice plate has a plurality of orifices therein having diameters between about seven-eighths and one and one-half inches through which said dough is discharged in a plurality of streams.

3. Apparatus for making cracker dough and the like comprising a plurality of proportional feeders for supplying dry and liquid ingredients of dough, screw conveying means for receiving said ingredients and advancing them, a mixer communicating with said conveying means for receiving said ingredients therefrom and mixing them to form dough, said mixer having a rotor with flat radial blades lying in radial planes extending axially of said rotor and a fixed orifice plate through which said dough is discharged, an elongated trough for receiving said dough from said mixer, a pair of rotatable, substantially parallel shafts extending lengthwise of said trough, means connecting said shafts for rotation in opposite directions, paddles on said shafts inclined to the axes thereof to advance said dough along said trough, said paddles on one shaft being offset lengthwise of and passing between the paddles on the other shaft, said trough having a bottom substantially complemental to the paths of the paddles adjacent thereto, and means for actuating said feeders, screw conveying means, mixer, and shafts.

4. Apparatus for making cracker dough and the like comprising a plurality of proportional feeders for supplying dry and liquid ingredients of dough, screw conveying means for receiving said ingredients and advancing them, a mixer communicating with said conveying means for receiving said ingredients therefrom and mixing them to form dough, said mixer having a rotor with flat radial blades lying in radial planes extending axially of said rotor and a fixed orifice plate through which said dough is discharged, an elongated trough for receiving said dough from said mixer, a pair of rotatable, substantially parallel shafts extending lengthwise of said trough, means for rotating said shafts in opposite directions, a plurality of paddles on each shaft and inclined to the axes of said shafts in a direction to advance said trough from said mixer to and discharge it at a place along said trough remote from said mixer, and means for actuating said feeders, screw conveying means, mixer, and shafts.

5. Apparatus for making cracker dough and the like comprising a plurality of proportional feeders for supplying dry and liquid ingredients of dough, screw conveying means for receiving said ingredients and advancing them, a mixer communicating with said conveying means for receiving said ingredients therefrom and mixing them to form dough, said mixer having a rotor with flat radial blades lying in radial planes extending axially of said rotor and a fixed orifice plate through which said dough is discharged, an elongated trough for receiving said dough from said mixer, a pair of rotatable substantially parallel shafts extending lengthwise of said trough, means for rotating said shafts in opposite directions, a plurality of paddles on each shaft and inclined to the axes of said shafts in a direction to advance said trough from said mixer to and discharge it at a place along said trough remote from said mixer, said shafts being spaced apart a distance only slightly in excess of the actual length of said paddles so that said paddles move through overlapping orbits, and means for actuating said feeders, screw conveying means, mixer, and shafts.

6. Apparatus for making cracker dough and the like comprising a screw conveyer, means for supplying dry and liquid ingredients continuously and in predetermined proportions to said screw conveyer, and a mixer for receiving said ingredients from said screw conveyer, said mixer including a plate having a plurality of orifices between seven-eighths of an inch and one and one-half inches in diameter therethrough, a rotor having a hub and a plurality of substantially flat blades extending from said hub in radial planes extending through the axis of said hubs and movable past said orifices, the pressure of the ingredients supplied by the screw conveyer to the mixer and the back pressure created by said orifices maintaining a constant pressure on the ingredients undergoing mixing in said mixer.

7. The apparatus set forth in claim 6 in which said screw conveyer comprises a screw and a casing therefor, said rotor being fixed to one end of said screw and said orifice plate being at an end of said casing adjacent to said rotor.

References Cited in the file of this patent

UNITED STATES PATENTS

| | | |
|---|---|---|
| 710,619 | Sharpless | Oct. 17, 1902 |
| 2,792,304 | Pavan | May 14, 1957 |
| 2,868,143 | Strahmann | Jan. 13, 1959 |
| 2,926,619 | Kruder | Mar. 1, 1960 |
| 2,977,968 | Fitzpatrick et al. | Aug. 29, 1961 |
| 3,033,132 | Duncan et al. | May 8, 1962 |

UNITED STATES PATENT OFFICE
CERTIFICATE OF CORRECTION

Patent No. 3,164,107　　　　　　　　　　　　January 5, 1965

Earle Thomas Oakes et al.

It is hereby certified that error appears in the above numbered patent requiring correction and that the said Letters Patent should read as corrected below.

Column 6, line 41, for "2,977,968" read -- 2,997,968 --.

Signed and sealed this 1st day of June 1965.

(SEAL)
Attest:

ERNEST W. SWIDER
Attesting Officer

EDWARD J. BRENNER
Commissioner of Patents